UNITED STATES PATENT OFFICE.

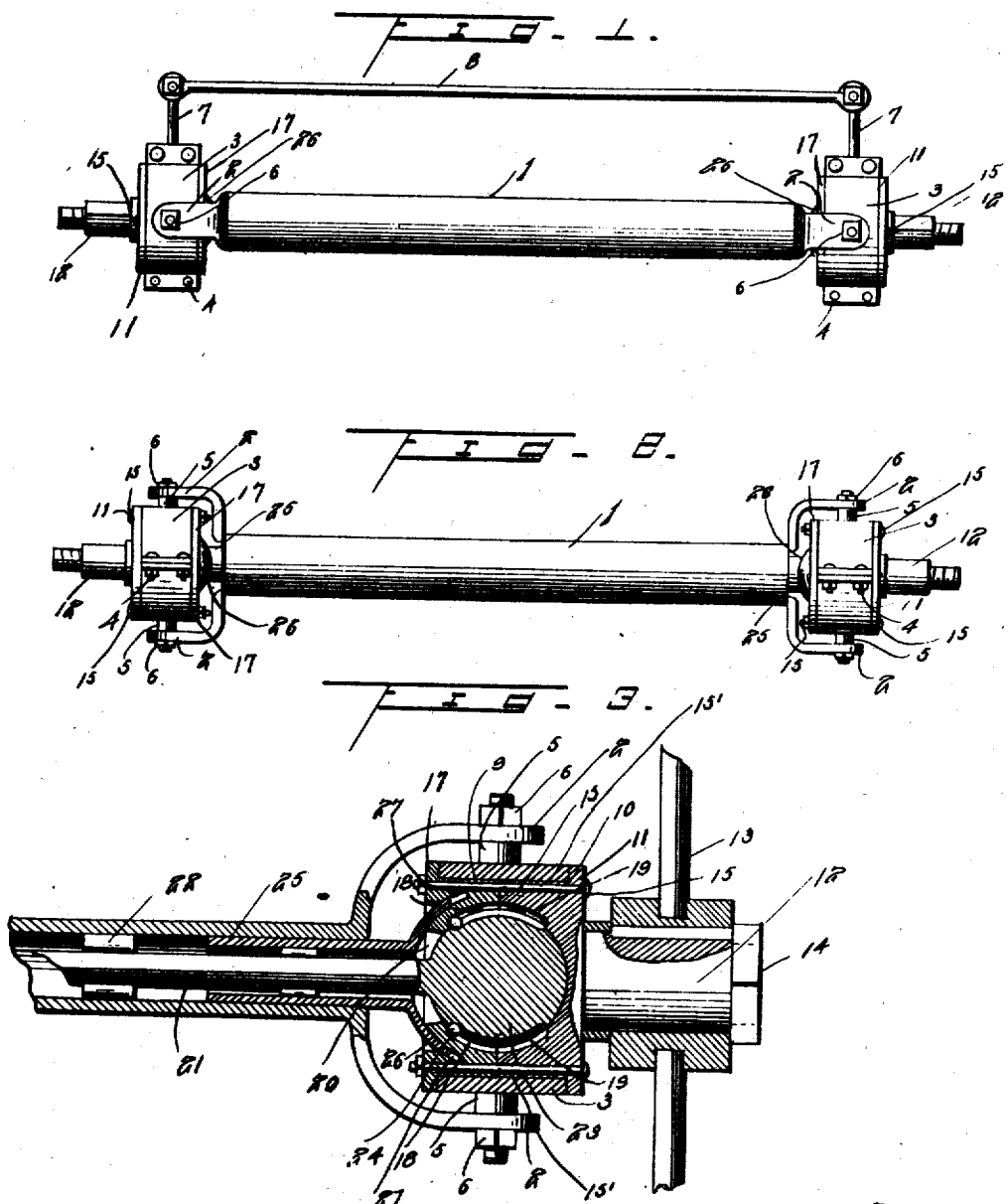

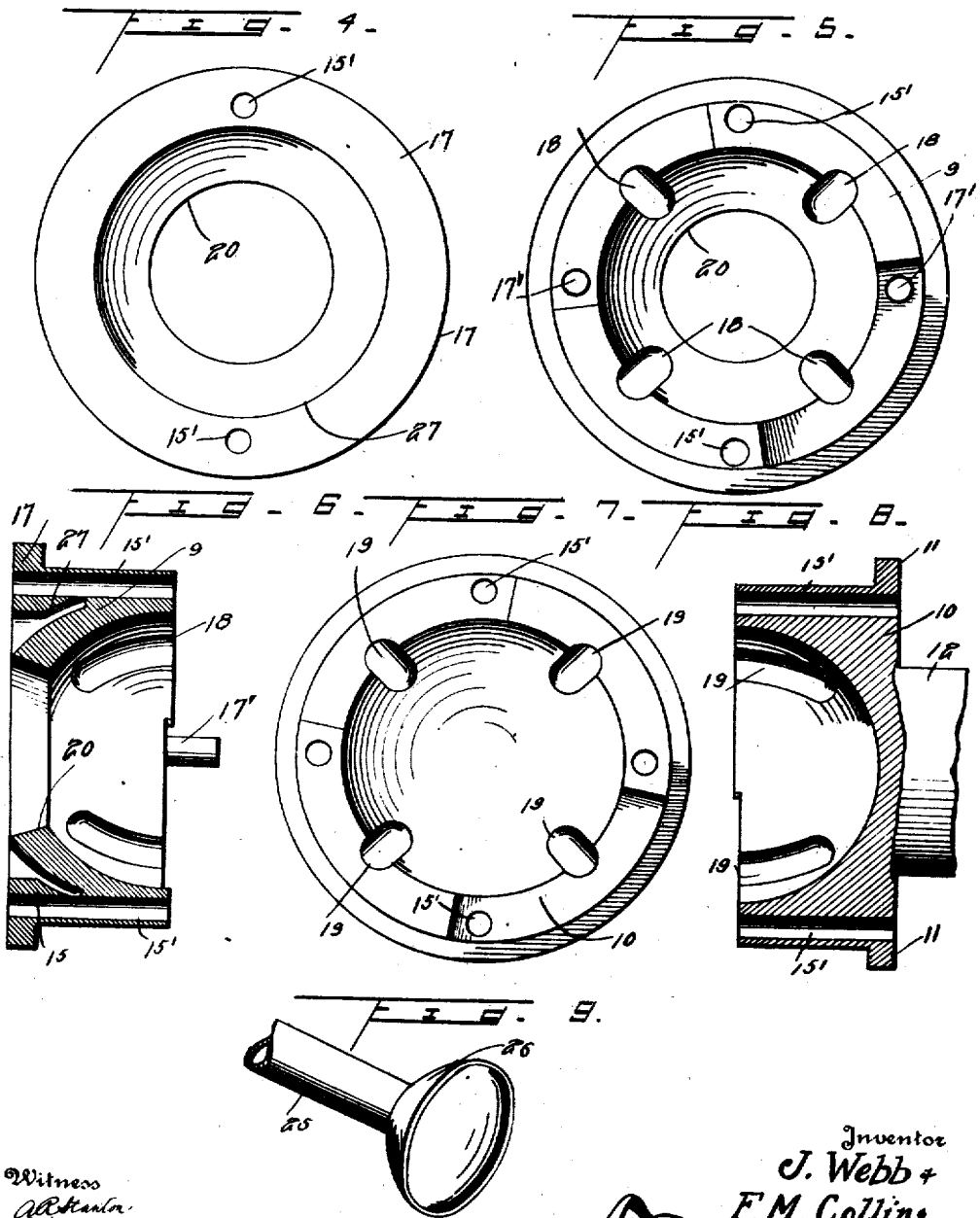

JAMES WEBB AND FONZO M. COLLINS, OF CAMP VERDE, ARIZONA.

BALL-BEARING KNUCKLE FOR AUTOMOBILE FRONT AXLES.

1,267,150.  Specification of Letters Patent.  Patented May 21, 1918.

Application filed October 25, 1916. Serial No. 127,630.

*To all whom it may concern:*

Be it known that we, JAMES WEBB and FONZO M. COLLINS, citizens of the United States, residing at Camp Verde, in the county of Yavapai and State of Arizona, have invented certain new and useful Improvements in Ball-Bearing Knuckles for Automobile Front Axles; and we do hereby declare the following to be a full, clear, and exact description of the invention, such as will enable others skilled in the art to which it appertains to make and use the same.

This invention relates to ball bearing knuckles for an automobile front axle, and has for its primary object the provision of means whereby the axle may be rotated about a horizontal axis and capable of being swung about a vertical axis to turn the front wheel so that the automobile may be readily steered and propelled through the front axle.

Another object of this invention is to provide a housing having sectional cuffs pivoted thereto in which are journaled socket members having the front wheels secured thereto whereby the cuffs may be swung about a vertical axis by the steering mechanism to turn the wheels.

A further object of this invention is to provide an axle journal in the housing having spheres formed on the ends thereof and located in the socket members and having grooves therein to coöperate with the grooves in the socket members to receive ball bearings to establish connection between the spheres and socket members, so that the socket members will be compelled to rotate with the axle and be free to swing about the vertical axis.

A still further object of this invention is the provision of ball bearing knuckles for automobile axles of the above stated character which will be simple, durable, and efficient, and which may be manufactured and sold at a comparatively small cost.

With these and other objects in view as will become more apparent as the description proceeds, the invention consists in certain novel features of construction, combination and arrangement of parts as will be hereinafter more fully described and claimed.

For a complete understanding of our invention reference will be had to the accompanying drawing, in which:

Figure 1 is a plan view of ball bearing knuckles for automobile front axles, constructed in accordance with our invention, Fig. 2 is a front elevation of the same, Fig. 3 is an enlarged sectional view taken on the line 3—3 of Fig. 2, Fig. 4 is a plan view upon an enlarged scale of one of the socket members looking in the direction of the inner face thereof, Fig. 5 is a similar view looking in the direction of the outer face thereof, illustrating the sockets and grooves formed in the wall thereof, Fig. 6 is a longitudinal sectional view of said socket member, Fig. 7 is a plan view of the outer socket member looking in the direction of the inner face thereof, Fig. 8 is a longitudinal sectional view of the outer socket member, and Fig. 9 is a detail perspective view of a sleeve coöperating with the inner socket member.

Referring in detail to the drawings, the numeral 1 indicates a housing, having pairs of relatively spaced arms 2 formed on each end thereof in which are pivoted sectional cuffs 3. The sectional cuffs 3 are secured together by bolts 4 and have oppositely disposed lugs 5 formed thereon which extend through apertures in the arms 2. The lugs 5 are each screw threaded to receive nuts 6 for retaining the lugs within the apertures of the arms 2. Rearwardly extending arms 7 are formed upon the cuffs 3 and are connected together by a connecting rod 8, which is connected to the steering mechanism of the automobile in the usual manner whereby the cuffs 3 may be swung about a vertical axis.

Journaled within the cuffs 3 are inner and outer socket members 9, and 10 respectively. The socket members 10 have formed upon their outer ends flanges 11. The outer faces of the outer socket members 10 have formed thereon spindles 12 to which are keyed wheels 13. The wheels 13 are further held upon the spindles 12 by nuts 14. The inner socket members 9 have flanges 17 formed upon their inner faces which engage the inner faces of the cuffs 3. Bolts 15 extend through openings 15' in the socket members 9 and 10 for retaining said socket members in tight engagement with each other and within the cuffs 3. The socket members 9 have pins 17' formed thereon which extend into the socket members 10 to further establish a connection between the socket members 9 and 10. The socket members 9 and 10 have formed within the walls thereof grooves 18 and 19, which grooves register when the socket members 9 and 10 are secured together. The socket members 9 are provided with openings 20 within their inner faces to allow the ends of an axle 21 to enter therein. The axle 21 is journaled within the housing 1 upon bearings 22. Spheres 23 are formed upon the ends of the axle 21 and located within the socket members 9 and 10 and are provided with grooves to coöperate with the grooves 18 and 19 and receiving ball bearings 24 to establish a connection between the socket members 9 and 10 and the spheres 23 whereby the socket members 9 and 10 are compelled to rotate within the cuffs 3 upon the rotation of the axle 21 but are capable of swinging about a vertical axis owing to the connection established between the spheres and the socket members 9 and 10. Sleeves 25 are secured within the ends of the housing 1 and project therefrom and have substantially funnel-shaped flanges 26 formed thereon which are received in grooves 27 formed upon the inner faces of the socket members 9 to prevent dirt and other foreign matter from entering the socket members 9 and 10 and which allow the socket members to rotate about a horizontal axis as well as to swing about a vertical axis.

In operation, the axle 21 is connected to the motor power of the automobile in any desired manner so as to be rotated therefrom. As the axle 21 is rotated, the socket members 9 and 10 are rotated within the cuffs 3 which rotate the wheels 13. By operating the steering mechanism, not shown, right or left, the cuffs 3 will be swung about a vertical axis which turns the socket members 9 and 10 about a vertical axis thus turning the wheels 3 in a corresponding direction.

While we have shown and described the preferred embodiment of our invention, it is to be understood that minor changes in construction, combination and arrangement of parts may be made without departing from the spirit and scope of the invention as claimed.

Having thus fully described our invention, what we claim is:

1. A knuckle for automobiles comprising a pair of companion socket members and one of said members having recesses in its inner end, lugs formed on the inner end of the other member and fitting in said recesses to prevent relative movement of said members, bolts connecting said members, annular flanges formed on the outer ends of said members, a cuff journaled on said members between said flanges, means pivotally connecting the cuff to an axle housing, an axle extending in one of said members, a sphere formed on said axle and located in said members, and means operatively connecting the sphere to said members.

2. A knuckle for automobiles comprising a pair of companion socket members, means connecting said members together, a cuff journaled on said members, an axle housing to which said cuff is pivoted, one of said members having an opening in its outer end communicating with the socket thereof, an axle journaled in said housing and extending through the opening of said member, said members having communicating grooves in the walls of their sockets, a sphere formed on said axle and located within said members and having grooves in registration with said grooves of the members, and balls located in said grooves.

3. A knuckle for automobiles comprising a pair of companion socket members, means connecting said members, a cuff journaled on said members, an axle housing to which said cuff is pivoted, an axle journaled in said housing and extending into said members, a sphere formed on said axle and located in said members, means establishing an operative connection between said sphere and said members, one of said members having a groove formed in its outer end, a sleeve in said housing, a substantially spherical flange formed upon said sleeve and received within said groove to establish a dust-proof connection between the housing and the members and also aiding in holding the members against relative movement in relation to the housing.

In testimony whereof we affix our signatures in presence of two witnesses.

JAMES WEBB.
FONZO M. COLLINS.

Witnesses:
C. C. REID,
WM. BROCK.